United States Patent
Fan

(10) Patent No.: US 8,905,548 B2
(45) Date of Patent: Dec. 9, 2014

(54) DEVICE AND METHOD FOR REDUCING SPECKLE IN PROJECTED IMAGES

(75) Inventor: Chun-Sheng Fan, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 160 days.

(21) Appl. No.: 13/593,316

(22) Filed: Aug. 23, 2012

(65) Prior Publication Data

US 2014/0055755 A1 Feb. 27, 2014

(51) Int. Cl.
| | |
|---|---|
| *G03B 21/14* | (2006.01) |
| *G03B 21/20* | (2006.01) |
| *G02B 27/48* | (2006.01) |
| *H04N 9/31* | (2006.01) |
| *G02B 3/00* | (2006.01) |
| *G02B 5/02* | (2006.01) |

(52) U.S. Cl.
CPC .............. *G02B 27/48* (2013.01); *G03B 21/147* (2013.01); *G03B 21/20* (2013.01); *G03B 21/208* (2013.01); *H04N 9/3161* (2013.01); *G02B 3/0056* (2013.01); *G02B 5/02* (2013.01)
USPC .................... 353/31; 353/37; 353/38; 353/94; 359/707; 349/64

(58) Field of Classification Search
CPC ...... G03B 21/14; G03B 21/147; G03B 21/20; G03B 21/208; G03B 21/2093; H04N 9/31; H04N 9/3129; H04N 9/3161; G02B 5/02; G02B 5/0215; G02B 5/0236; G02B 27/48; G02B 3/0056
USPC ................. 353/20, 30–31, 33, 37–38, 85, 94; 359/245, 259, 279, 707; 349/5, 7–9, 64
See application file for complete search history.

(56) References Cited

U.S. PATENT DOCUMENTS

| | | |
|---|---|---|
| 5,029,975 A | 7/1991 | Pease |
| 6,594,090 B2 | 7/2003 | Kruschwitz et al. |

(Continued)

FOREIGN PATENT DOCUMENTS

| | | |
|---|---|---|
| TW | 200916824 A1 | 4/2009 |
| TW | 201015111 A1 | 4/2010 |
| TW | 201015197 A1 | 4/2010 |
| TW | 201213858 A1 | 4/2012 |

OTHER PUBLICATIONS

Jutamulia, S.et al., "Reduction of coherent noise using various artificial incoherent sources," Optik, 70, No. 2 (1985) pp. 52-57.

(Continued)

*Primary Examiner* — Tony Ko
*Assistant Examiner* — Jori S Reilly-Diakun
(74) *Attorney, Agent, or Firm* — Blakely Sokoloff Taylor & Zafman LLP

(57) ABSTRACT

An image projector includes a light source for displaying light and a diffusing screen coupled to an in-plane vibrator. The diffusing screen is positioned to receive the display light from the light source and generate phase-modulated display light. The image projector also includes a collimating element positioned to receive the phase-modulated display light. The image projector further includes a display panel positioned to receive the phase-modulated display light after being collimated by the collimating element. The display panel is configured to generate a projectable image using the phase-modulated display light.

15 Claims, 10 Drawing Sheets

(56) References Cited

U.S. PATENT DOCUMENTS

| | | | |
|---|---|---|---|
| 6,791,739 B2 | 9/2004 | Ramanujan et al. | |
| 7,271,962 B2* | 9/2007 | Kasazumi et al. | 359/707 |
| 7,369,298 B2 | 5/2008 | Lee et al. | |
| 7,547,873 B2* | 6/2009 | Babayoff et al. | 250/216 |
| 7,646,518 B2* | 1/2010 | Kasazumi | 359/196.1 |
| 7,706,048 B2* | 4/2010 | Horikawa et al. | 359/290 |
| 7,715,084 B2 | 5/2010 | Tan et al. | |
| 7,748,853 B2* | 7/2010 | Yamauchi | 353/97 |
| 7,866,831 B2* | 1/2011 | Kasazumi et al. | 353/98 |
| 7,872,800 B2* | 1/2011 | Rickers et al. | 359/443 |
| 7,969,644 B2 | 6/2011 | Tilleman et al. | |
| 8,109,638 B2* | 2/2012 | Chen et al. | 353/31 |
| 8,172,141 B2 | 5/2012 | Knowles et al. | |
| 8,226,241 B2* | 7/2012 | Chen et al. | 353/31 |
| 8,226,247 B2* | 7/2012 | Kitano et al. | 353/99 |
| 8,317,333 B2* | 11/2012 | Kasazumi et al. | 353/34 |
| 2003/0030880 A1 | 2/2003 | Ramanujan et al. | |
| 2003/0039036 A1* | 2/2003 | Kruschwitz et al. | 359/707 |
| 2006/0023284 A1 | 2/2006 | Lee et al. | |
| 2007/0070303 A1* | 3/2007 | Yonekubo | 353/94 |
| 2008/0079904 A1* | 4/2008 | Bartlett | 353/31 |
| 2008/0106779 A1 | 5/2008 | Peterson et al. | |
| 2009/0185251 A1* | 7/2009 | Chen et al. | 359/199.3 |
| 2010/0290009 A1* | 11/2010 | Chen et al. | 353/31 |
| 2010/0309439 A1* | 12/2010 | Bi et al. | 353/33 |
| 2011/0002019 A1 | 1/2011 | Routley et al. | |
| 2011/0261274 A1 | 10/2011 | Shiue et al. | |
| 2012/0002174 A1 | 1/2012 | Shiue et al. | |
| 2013/0010365 A1* | 1/2013 | Curtis | 359/626 |

OTHER PUBLICATIONS

Hsu, Shu-Ting et al., "Two dimensional microscanners with large horizontal-vertical scanning frequency ratio for high resolution laser projectors," MOEMS and Miniaturized Systems VII, edited by David L. Dickensheets, Harald Schenk, Proc. of SPIE vol. 6887, 688703 (2008) 13 pages.

Chen, Jiun-Yuan et al. "Comparison of Control of Coherence of Partially Incoherent Light Source and Fiber Optic Cross Sectional Microscopic Image," 2009 Annual Meeting of Physics Society of Republic of China (In Chinese), English translation of Abstract enclosed, 2 pages.

Nguyen, C. "MEMS Comb-Drive Actuators," EE 143, Microfabrication Technology, Spring 2010, 3 pages.

TW Application No. 102123505—First Taiwanese Office Action and Search Report, with English Translation, mailed Aug. 8, 2014 (17 pages).

* cited by examiner

DEVICE AND METHOD FOR REDUCING SPECKLE IN PROJECTED IMAGES

TECHNICAL FIELD

This disclosure relates generally to optics, and in particular but not exclusively, relates to image projectors.

BACKGROUND INFORMATION

Many conventional projector displays include a display that modulates an illuminating light beam. The illuminating light beam may be a white light provided by a light source, such as metal halide lamps, xenon lamps, or mercury lamps. On the other hand, the illuminating light beam may include three separate color light beams, which are red, green, and blue light beams. Each color light beam may be separately provided by a light emitting diode ("LED"), a laser diode, or other types of laser such as gas laser, solid state laser, etc. The display panel may be a digital micro-mirror device ("DMD") or micro-electro-mechanical system ("MEMS") such as in a digital light processing ("DLP") display system. The display panel may also be a liquid crystal display ("LCD") or liquid crystal on silicon ("LCOS") display.

Lasers have some advantages over other light sources. For example, their lifespan is about 10,000 hours in contrast to an approximately 1,500 hours of lifespan of mercury lamps. The brightness of lasers can be as high as 10,000 lumens, or more. In contrast, an LED projector lamp may provide approximately 1,000 lumens. A home theater projector may require at least 1,000 lumens. Lasers may also provide a wider color gamut as compared with traditional light sources.

In addition, a laser light source is compact in size, which may be more suitable for a pico projector. A pico projector is a projector used in handheld devices such as mobile phones, personal digital assistants, digital cameras, etc, which have little space to accommodate an attached display screen. Thus, a displayed image is projected onto any nearby viewing surface such as a wall.

The coherent nature of laser light can cause undesired laser speckles. A coherent laser beam incident on a non-specular reflecting surface such as a display screen or a wall, may be scattered with random phase by the surface. The random phase is caused by the random microscopic profile of the surface. When an observer looks at the projected image on the display screen or wall, the scattered light with random phase will interfere to form a speckle pattern in the retina of the observer. A speckle pattern is characterized by some spots appearing blacked out in a supposedly bright area. The blacked out spots appear to sparkle when there is relative movement between the scattering surface and the observer. Thus, the observer may perceive a projected image corrupted by a speckle pattern. Accordingly, a method or apparatus for reducing speckles is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for reducing speckle in projected images are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be appreciated, a speckle reducing device and method for reducing speckles in a projected image may provide for the reduction or elimination of laser speckles in a projected image produced by laser light illumination. In addition, examples of the disclosed speckle reducing device may provide a light source that has high brightness, long lifespan, wide color gamut, and compact size, which are advantageous for a pico projector.

It is appreciated that the teachings of the disclosure are applicable to all types of projections display panels including DMD, MEMS, DLP, LCD, and LCOS. Additionally, if a laser is used as a light source, the laser used may be laser diodes (semiconductor lasers), gas lasers, solid state lasers, and other types of lasers such as fiber lasers. However, for illustration, only a pico projector using an LCOS display panel and laser diodes will be described.

Figure 1:
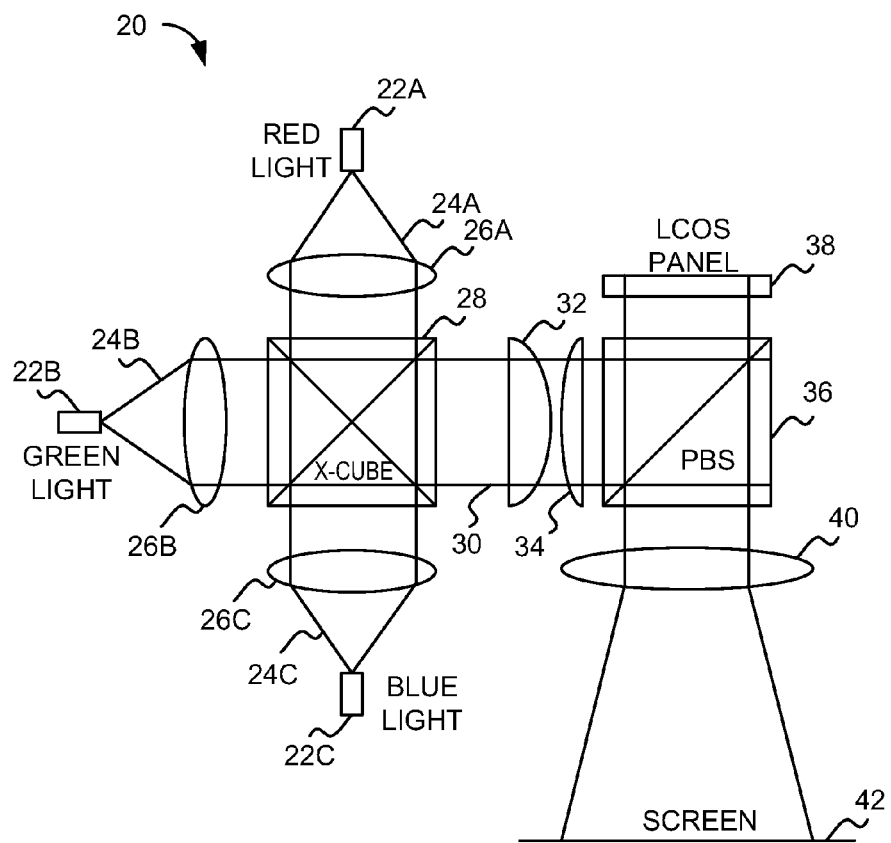
FIG. 1 is a block diagram of a typical pico projector using an LCOS panel.

FIG. 1 is a block diagram of a typical pico projector 20 using an LCOS panel. Light beams 24A, 24B, and 24C are emitted by a red laser diode 22A, a green laser diode 22B, and a blue laser diode 22C, respectively. Light beams 24A, 24B, and 24C are collimated by collimating lenses 26A, 26B, and 26C, respectively. The green laser diode may be replaced with a green IR-pumped solid state laser. The collimated light beams may be combined using a dichroic combiner cube ("X-cube") 28 and become a combined light beam 30. Beam 30 passes through a first magnifier lens 32 and a second magnifier lens 34, and is reflected by a polarizing beam splitter ("PBS") 36 toward an LCOS panel 38. The incident light is polarization-modulated by LCOS panel 38. The polarization-modulated light is reflected by LCOS panel 38, passes through PBS 36 (thus becomes intensity-modulated) and passes through a projection lens 40 to arrive on a screen 42. When an observer looks at the image projected on the screen, the scattered laser light with random phase from the screen may interfere producing an undesired speckle pattern in the retina of the observer. The observer may perceive the projected image as corrupted by the speckle pattern.

Figure 2:
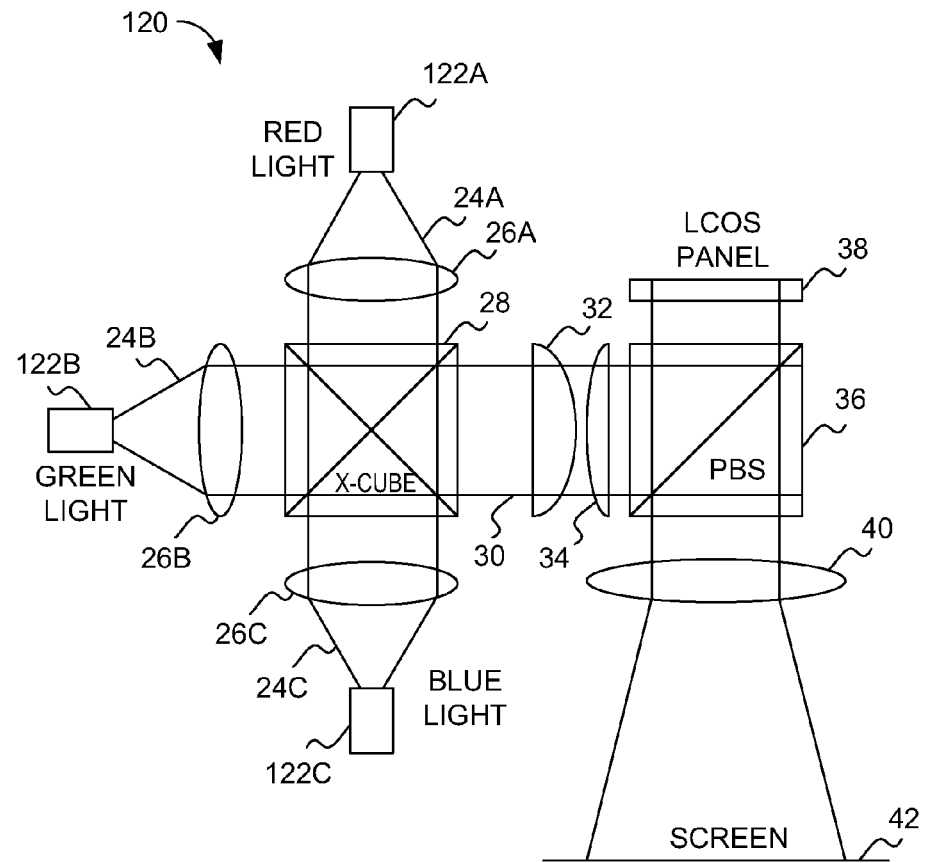
FIG. 2 illustrates an example block diagram of a pico projector using an LCOS panel, in accordance with an embodiment of the disclosure.

FIG. 2 illustrates an example block diagram of a pico projector 120 using LCOS panel 38, in accordance with an embodiment of the disclosure. Light beams 24A, 24B, and 24C from a red laser module with despeckle device 122A, a green laser module with despeckle device 122B, and a blue laser module with despeckle device 122C, are collimated by collimating lenses 26A, 26B, and 26C, respectively. Each laser module includes a despeckle device that includes a diffusing screen. Each collimating lens collimates laser light after being phase-modulated by the diffusing screen. In the illustrated embodiment, a dichroic combiner cube (X-cube) 28 combines the collimated light beams into combined light beam 30. Beam 30 passes through a first magnifier lens 32 and a second magnifier lens 34, and is reflected by a polarizing beam splitter ("PBS") 36 toward an LCOS panel 38. The incident light is polarization-modulated by LCOS panel 38. The polarization-modulated light is reflected by LCOS panel 38, passes through PBS 36 (thus becomes intensity-modulated) and passes through a projection lens 40 to arrive on a screen 42.

Figure 3:
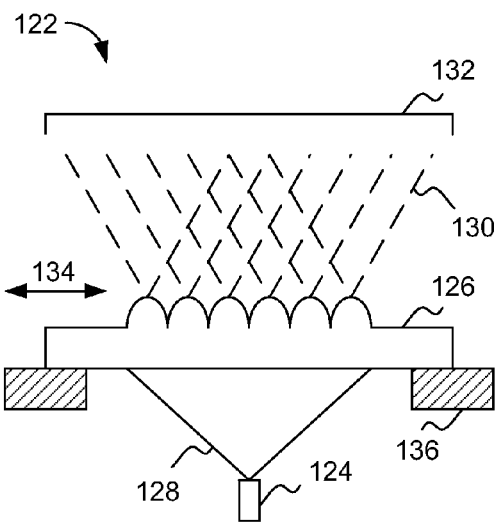
FIG. 3 illustrates an example laser module that includes a transmissive diffusing screen, in accordance with an embodiment of the disclosure.

FIG. 3 illustrates a laser module 122 that includes a transmissive diffusing screen, in accordance with an embodiment of the disclosure. Laser module 122 is an example laser module that could be used as red laser module 122A, green laser module 122B, and blue laser module 122C. Laser module 122 includes a laser diode 124 (which could be a variety of colors) and a transmissive diffusing screen 126. For a green laser module, a green IR-pumped solid state laser may replace a green laser diode. Transmissive diffusing screen 126 may be a transmissive micro-lens array screen, a transmissive micro-fly-eye lens array screen, a transmissive screen with nano particles, or any type of transmissive diffusing screen. In FIG. 3, transmissive diffusing screen 126 is illustrated as a micro-lens array screen. Although transmissive diffusing screen 126 is illustrated as a micro-lens array screen in the disclosure, it is appreciated that a diffusing screen may also be a micro-fly-eye lens array screen, a screen with nano particles, or any type of diffusing screen.

A single beam 128 from laser diode 124 is converted into multiple beams 130 from a plurality of virtual sources by transmissive micro-lens array screen 126. In other words, laser beam 128 is phase-modulated by transmissive micro-lens array screen 126. Although multiple beams 130 appear like a single beam 132, they are different beams from separate virtual sources. In FIG. 1, the viewed speckle pattern is generated by a single beam. In FIG. 2, the viewed speckle is generated by multiple beams 130. Accordingly, there is more interferences among beams having random phases taking place in FIG. 2 than in FIG. 1. As a result, the speckle size in FIG. 2 may be less than the speckle size in FIG. 1.

When micro-lens array screen 126 moves in-plane as shown by an arrow 134, the light paths from the virtual sources to the display screen and to the retina, which are involved in the interferences, change, and the generated speckle pattern accordingly changes. The change is faster for the speckle pattern having smaller speckle size. However, the projected image does not change as the position of micro-lens array screen 126 changes. Thus, if micro-lens array screen 126 is vibrated in-plane fast enough (i.e. faster than the response time of the eye), as shown by arrow 134, the viewed speckle pattern may be washed away, while the projected image is unchanged.

Micro-lens array screen 126 is secured on an in-plane vibrator 136 having vibration shown by arrow 134. The vibrated micro-lens array screen 126 may cause the viewed speckle pattern to be reduced or even disappear (as perceived by a human eye), while the projected image is unaffected. Laser light 128 is phase-modulated by vibrated transmissive diffusing screen 126.

Figure 4:
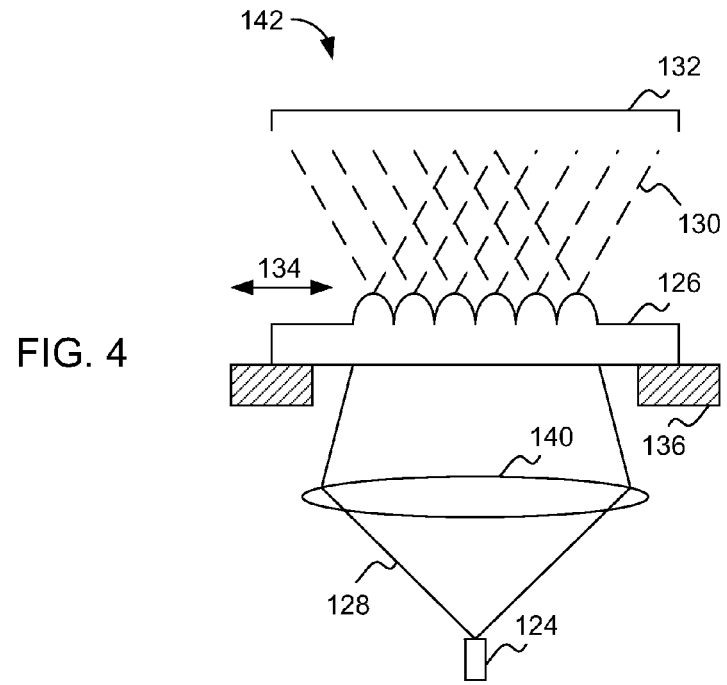
FIG. 4 illustrates a lens positioned between a laser diode and a transmissive diffusing screen, in accordance with an embodiment of the disclosure.

FIG. 4 illustrates a lens 140 positioned between laser diode 124 and transmissive diffusing screen 126, in accordance with an embodiment of the disclosure. Laser module 142 is an example laser module that could be used as red laser module 122A, green laser module 122B, and blue laser module 122C. Laser module 142 includes lens 140 positioned between laser diode 124 and transmissive diffusing screen 126, which may better control the area illuminated by the laser light. Lens 140 may also collimates the laser light emitted by laser diode 124. Laser light 128 is phase-modulated by vibrated transmissive diffusing screen 126.

Figure 5:
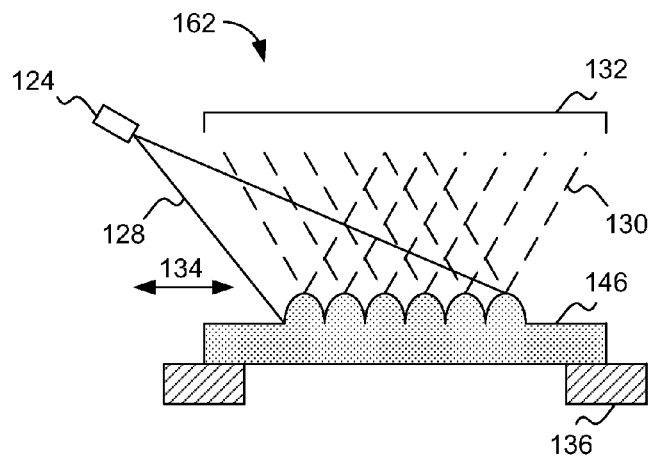
FIG. 5 illustrates a laser module including a reflective diffusing screen, in accordance with an embodiment of the disclosure.

FIG. 5 shows an embodiment that may share similarities to FIG. 3. Instead of using a transmissive diffusing screen 126, laser module 162 includes a reflective diffusing screen 146, in accordance with an embodiment of the disclosure. Laser module 162 is an example laser module that could be used as red laser module 122A, green laser module 122B, and blue laser module 122C. Reflective diffusing screen 146 may be a reflective micro-lens array screen, a reflective micro-fly-eye lens array screen, a reflective screen with nano particles, or any type of reflective diffusing screen. For illustration, a reflective micro-lens array screen 146 is illustrated in FIG. 5. In this manner, a single beam 128 from laser diode 124 is reflected into multiple beams 130 from a plurality of virtual sources by reflective micro-lens array screen 146. Laser light 128 is phase-modulated by vibrated reflective diffusing screen 146.

Figure 6:
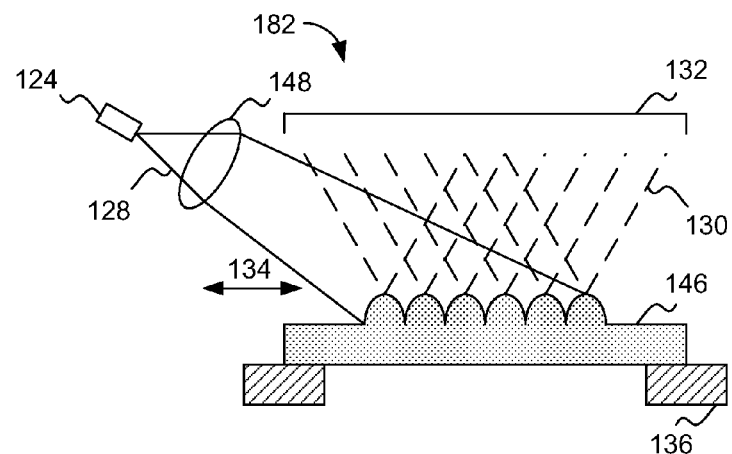
FIG. 6 illustrates a lens positioned between a laser diode and a reflective diffusing screen, in accordance with an embodiment of the disclosure.

FIG. 6 illustrates a lens 148 positioned between laser diode 124 and reflective diffusing screen 146, in accordance with an embodiment of the disclosure. Laser module 182 is an example laser module that could be used as red laser module 122A, green laser module 122B, and blue laser module 122C. Laser module 182 includes lens 148 positioned between laser diode 124 and reflective diffusing screen 146, which may better control the area illuminated by the laser light. Lens 148 may also collimates the laser light emitted by laser diode 124. Laser light 128 is phase-modulated by vibrated reflective diffusing screen 146.

Figure 7:
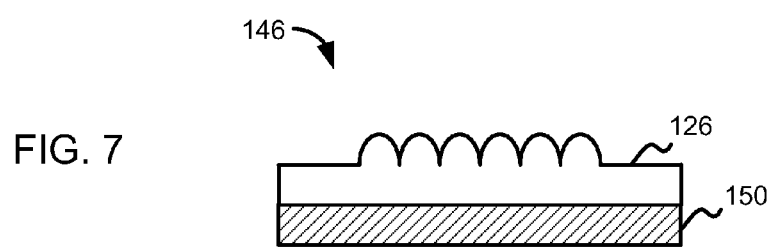
FIG. 7 illustrates an example block diagram of a reflective diffusing screen, in accordance with an embodiment of the disclosure.

FIG. 7 illustrates an example block diagram of reflective diffusing screen 146. In the illustrated embodiment, reflective diffusing screen 146 includes a transmissive diffusing screen 126 and a reflecting substrate 150. Other configurations or constructions of reflective diffusing screen 146 are possible.

Figure 8:
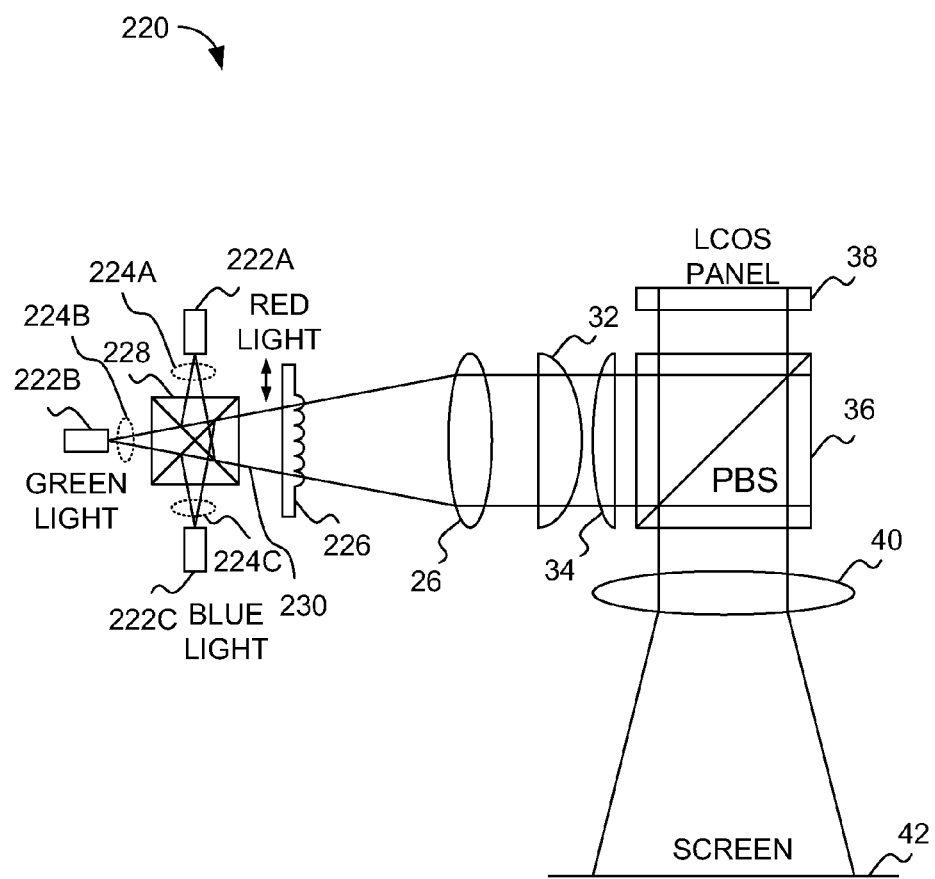
FIG. 8 illustrates an example block diagram of a pico projector using a transmissive diffusing screen, in accordance with an embodiment of the disclosure.

FIG. 8 illustrates an example block diagram of a pico projector 220 using a transmissive diffusing screen, in accordance with an embodiment of the disclosure. In the illustrated embodiment, instead of having three separate laser modules with despeckle devices as shown in FIG. 2, three laser beams can first be combined using a dichroic combiner cube. More specifically, dichroic combiner cube 228 combines light beams from a red laser diode 222A, a green laser diode 222B, and a blue laser diode 222C into a combined light beam 230. The green laser diode may be replaced with a green IR-pumped solid state laser. Combined light beam 230 passes through a vibrated transmissive micro-lens array screen 226. Thus, combined light beam 230 is phase-modulated by vibrated transmissive micro-lens array screen 226. A collimating lens 26 collimates the combined light beam after passing through vibrated transmissive micro-lens array screen 226. Lenses 224A, 224B, and 224C may be optionally included between laser diode 222A, 222B, and 222C and dichroic combiner cube 228, respectively. An image projected by pico projector 220 may have a reduced speckle pattern compared to conventional pico projectors.

Figure 9:
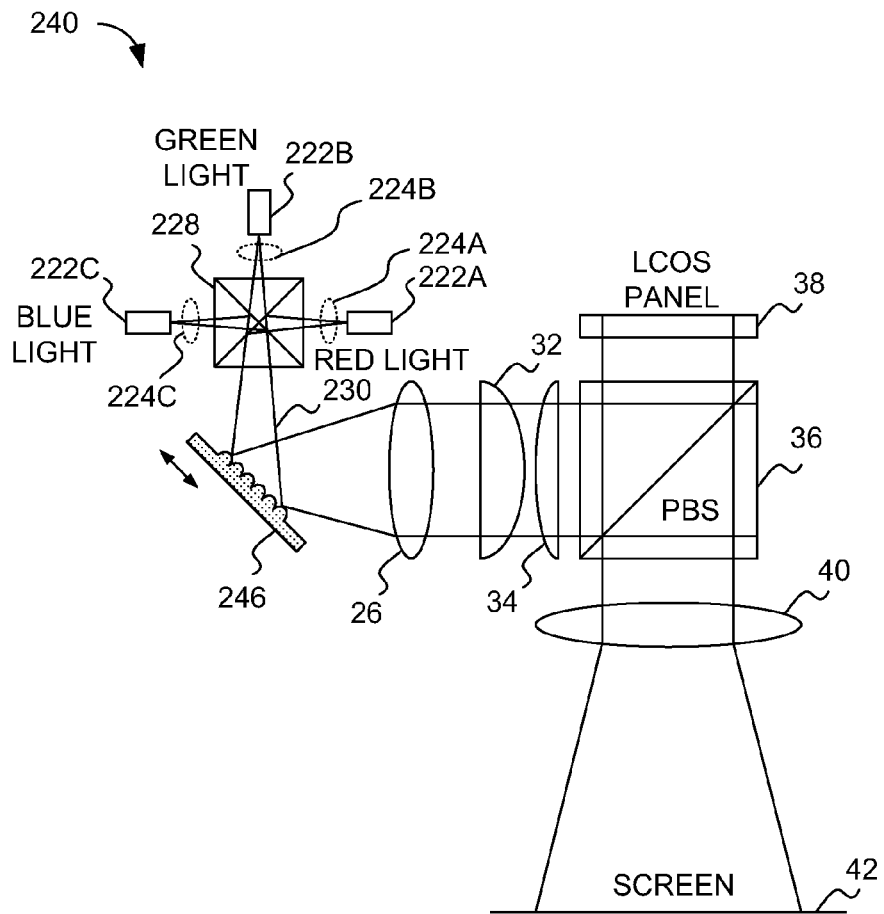
FIG. 9 illustrates a schematic diagram of a pico projector using a reflective diffusing screen, in accordance with an embodiment of the disclosure.

FIG. 9 shows an example block diagram of pico projector 240 using a reflective diffusing screen, in accordance with an embodiment of the disclosure. Dichroic combiner cube 228 combines light beams from a red laser diode 222A, a green laser diode 222B, and a blue laser diode 222C into combined light beam 230. Combined light beam 230 is reflected by a vibrated reflective micro-lens array screen 246. Thus, combined light beam 230 is phase-modulated by vibrated reflective micro-lens array screen 246. Reflective micro-lens array screen 246 may be similar to reflective diffusing screen 146 shown in FIG. 7. A collimating lens 26 collimates the combined light beam after being reflected by vibrated reflective micro-lens array screen 246. Lenses 224A, 224B, and 224C may be optionally included between laser diode 222A, 222B, and 222C and dichroic combiner cube 228, respectively. An image projected by pico projector 220 may have a reduced speckle pattern compared to conventional pico projectors.

Figure 10:
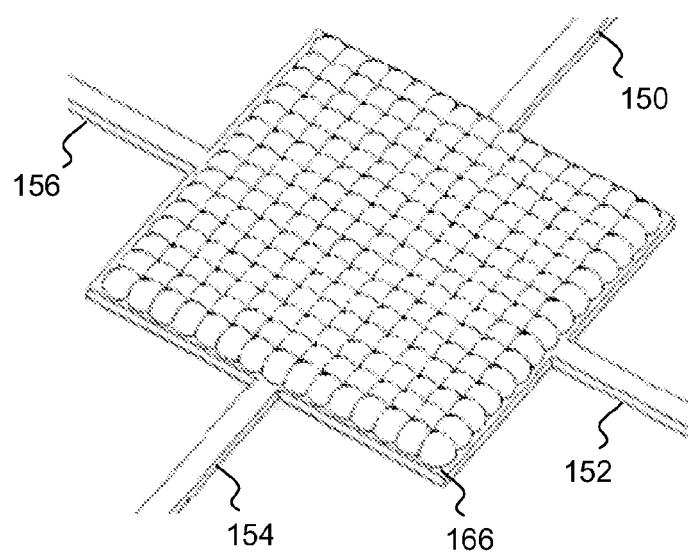
FIG. 10 illustrates a micro-lens array screen with four tethering beams, in accordance with an embodiment of the disclosure.

FIG. 10 illustrates a micro-lens array screen 166 with four tethering beams (150, 152, 154, and 156), in accordance with an embodiment of the disclosure. Micro-lens array screen 166 may be exemplary of micro-lens array screens 126, 146, 226, or 246. The tethering beams are configured to secure on an in-plane vibrator 136 of FIGS. 3-6.

Figure 11:
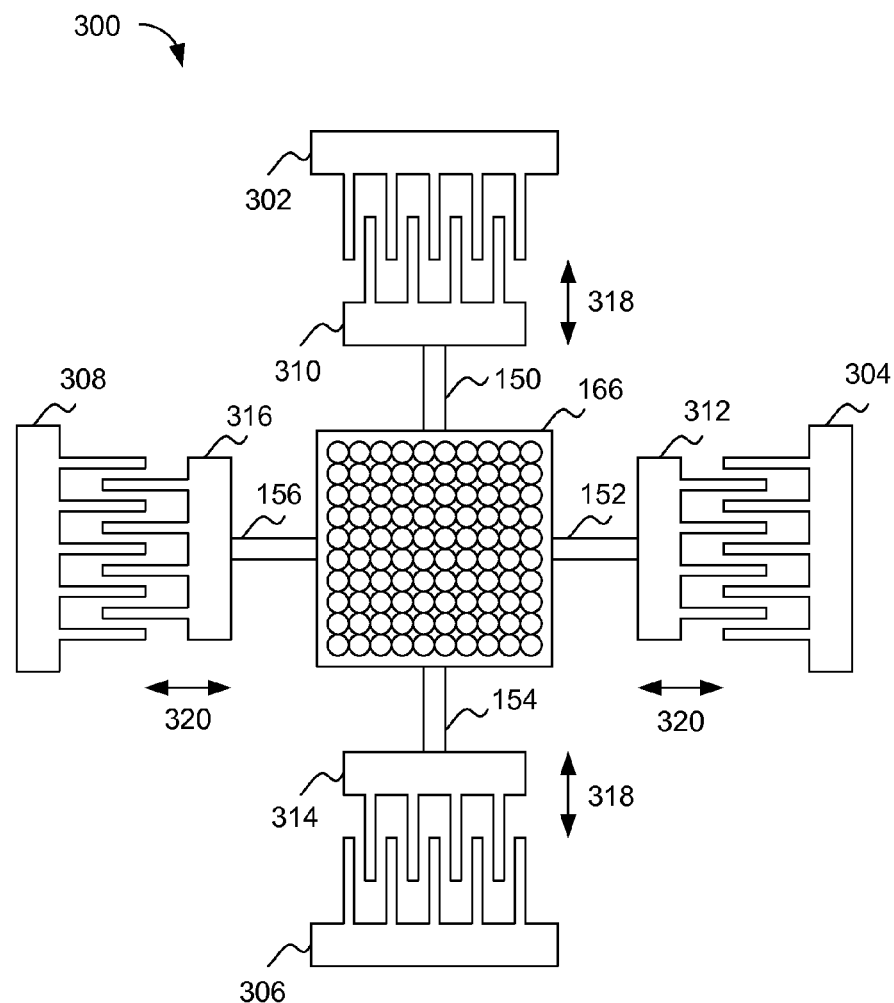
FIG. 11 illustrates an example block diagram of a 2D comb-drive actuator MEMS having a diffusing screen secured on it, in accordance with an embodiment of the disclosure.

In-plane vibrator 136 includes a comb-drive actuator MEMS (micro-electro-mechanical system) and other types of actuators. FIG. 11 illustrates an example block diagram of a comb-drive actuator MEMS 300 having micro-lens array screen 166 secured on it, in accordance with an embodiment of the disclosure. Comb-drive actuator MEMS 300 includes four fixed comb electrodes 302, 304, 306, and 308 anchored to the substrate (not shown). Four moving comb electrodes 310, 312, 314, and 316 are secured with micro-lens array screen 166 via tethering beams 150, 152, 154, and 156, respectively. Properly applying electric voltages to the comb electrodes will move micro-lens array screen 166 in-plane in the directions shown by arrows 318 and 320. The tethering beams may be flexible and elastic to allow micro-lens array screen 166 to vibrate. Alternatively, the tethering beams may be rigid, and they are suspended by electro static field, which will also allow micro-lens array screen 166 to vibrate. In this manner, micro-lens array screen 166 is vibrated in a 2D movement, i.e., in directions shown by arrows 318 and 320.

It is appreciated that a speckle is averaged out if its intensity varies from maximum to minimum in the integration time, i.e., the response time of the eye. Accordingly, a 1D vibration of micro-lens array screen 166 may be sufficient to reduce the laser speckles produced in the projected image, if the 1D vibration generates sufficient speckle intensity variation from maximum to minimum in the integration time. Furthermore, the 1D movement of micro-lens array screen 166 may not cause a corresponding 1D movement of the speckle pattern, instead, it may cause a random change of the speckle pattern.

Figure 12:
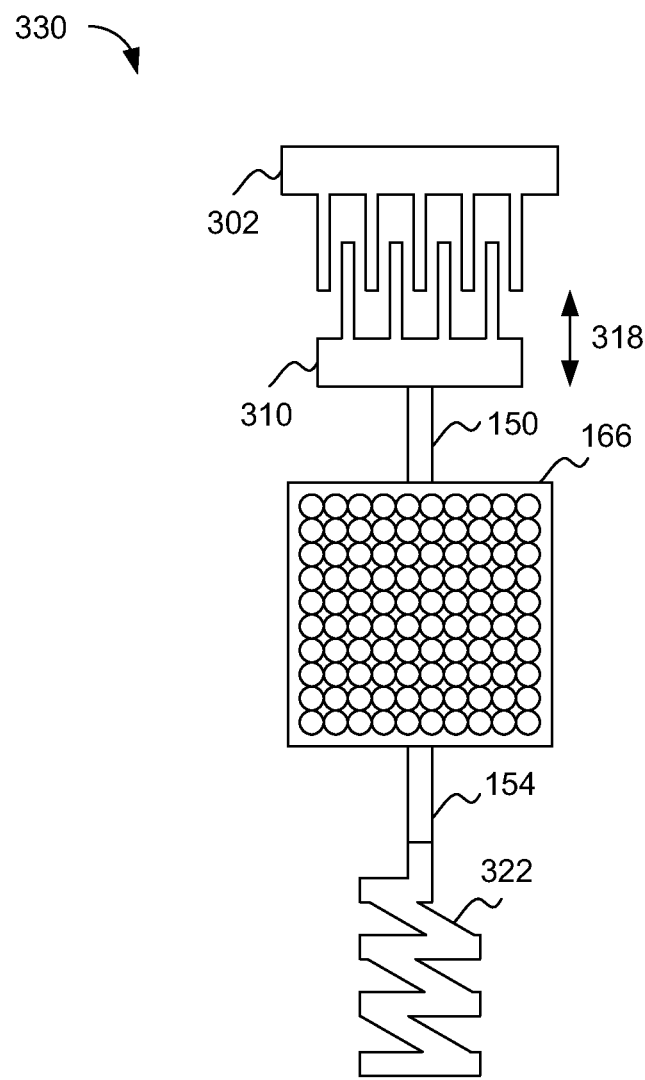
FIG. 12 illustrates an example block diagram of a 1D comb-drive actuator MEMS having a diffusing screen secured on a moving frame, in accordance with an embodiment of the disclosure.

FIG. 12 illustrates an example block diagram of a comb-drive actuator MEMS 330 having micro-lens array screen 166 secured on it, in accordance with an embodiment of the disclosure. Comb-drive actuator MEMS 330 includes a fixed comb electrodes 302 anchored to the substrate (not shown). Moving comb electrode 310 is secured with micro-lens array screen 166 through a tethering beam 150. Another tethering beam 154 secures micro-lens array screen 166 on an extendable support 322. Properly applying electric voltages to the comb electrodes will move micro-lens array screen 166 in-plane in the directions shown by arrow 318. Extendable support 322 allows micro-lens array screen 166 to vibrate. In this manner, micro-lens array screen 166 is vibrated in a 1D movement, i.e., in a direction shown by arrow 318.

Figure 13:
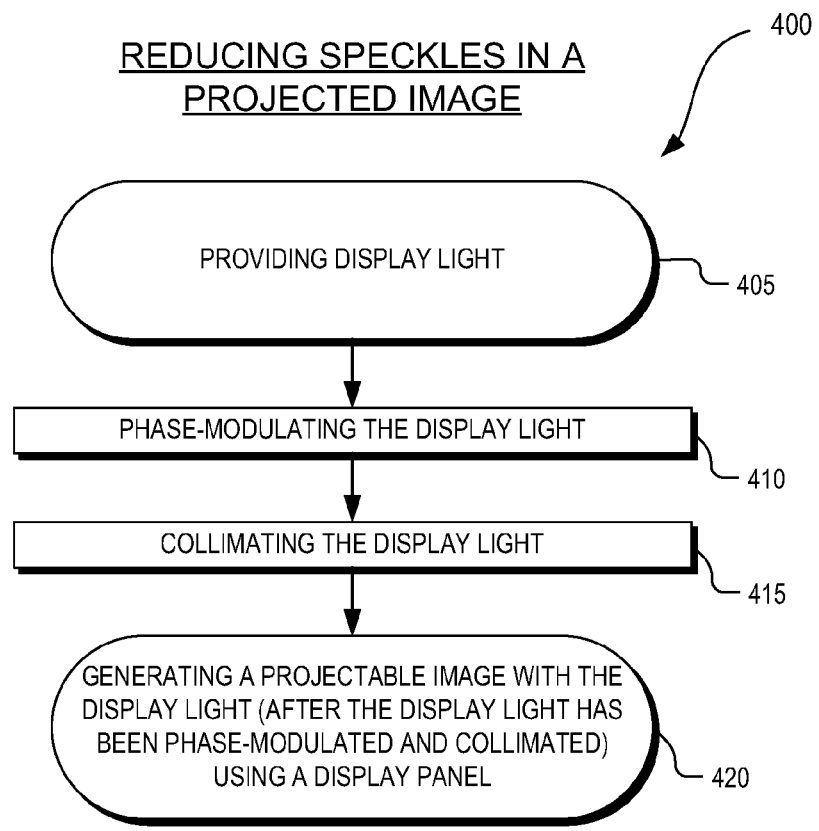
FIG. 13 shows a flow chart of a method for reducing laser speckles in a projected image, in accordance with an embodiment of the disclosure.

FIG. 13 shows a flow chart of a method 400 for reducing speckles in a projected image, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, display light is provided. Display light can include more than one color of light (e.g. red, green, and blue) or a combined beam (e.g. combine beam 30). The display light is phase-modulated in process block 410. The display light may be phase-modulated by passing the display light through a diffusion screen (e.g. diffusing screen 126 or 146) coupled to a vibrator (e.g. in-plane vibrator 136). If the display light includes more than one color of light, each color of light may be phase modulated individually, as shown in FIG. 2. In process block 415, the display light is collimated. The display light may be collimated with a lens such as lens 26, 26A, 26B, or 26C. In process block 420, a display panel (e.g. LCOS panel 38) receives the display light after the display light has been collimated and phase-modulated and the display panel generates a projectable image with the display light. The display light may be directed toward the display panel by a polarized beam splitter.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image projector comprising:
    first, second, and third light modules, each of the light modules comprising:
        a light source; and
        a reflective diffusing screen coupled to an in-plane vibrator that includes at least one comb-drive actuator connected to move the reflective diffusing screen in-plane, the reflective diffusing screen including a homogeneous micro-lens array, wherein the reflective diffusing screen is positioned to receive light from the light source and generate phase-modulated light, and wherein the phase-modulated light from the light source of the first light module is a first color light, the phase-modulated light from the light source of the second light module is a second color light, and the phase-modulated light from the light source of the third light module is a third color light;
    a dichroic combiner cube coupled to receive and combine the first color light, the second color light, and the third color light into display light;
    a collimating element positioned between each of the light modules and the dichroic combiner cube to collimate the first color light, the second color light, and the third color light; and
    a display panel positioned to receive the display light, wherein the display panel is configured to generate a projectable image using the display light.

2. The image projector of claim 1, wherein the display panel is a Liquid Crystal On Silicon ("LCOS") panel and the image projector of claim 1 further comprises:
    a polarizing beam splitter ("PBS") positioned to direct the display light toward the LCOS panel.

3. The image projector of claim 1, wherein the light source is one of a laser diode, a gas laser, and a solid state laser.

4. The image projector of claim 1, wherein each of the light modules further comprises a lens positioned between the light source and the reflective diffusing screen of each light module.

5. The image projector of claim 1, wherein the reflective diffusing screen includes a transmissive diffusing element laminated to a reflective substrate.

6. An image projector comprising:
    a light source for providing display light;
    a reflective diffusing screen coupled to an in-plane vibrator that includes at least one-comb drive actuator connected to move the reflective diffusing screen in-plane, the reflective diffusing screen including a homogeneous micro-lens array, wherein the reflective diffusing screen is positioned to receive the display light from the light source and generate phase-modulated display light;
    a collimating element positioned to receive the phase-modulated display light; and
    a display panel positioned to receive the phase-modulated display light after being collimated by the collimating element, wherein the display panel is configured to generate a projectable image using the phase-modulated display light.

7. The image projector of claim 6, further comprising a lens positioned between the light source and the reflective diffusing screen.

8. The image projector of claim 6, wherein the reflective diffusing screen includes a transmissive diffusing element laminated to a reflective substrate.

9. The image projector of claim 6, wherein the light source comprises:
    a first color, second color, and third color light source for providing, respectively, first color light, second color light, and third color light; and
    a light combiner optically coupled to combine the first color light, the second color light, and the third color light into the display light.

10. The image projector of claim 9, wherein the light combiner includes a dichroic combiner cube.

11. The image projector of claim 6, wherein the light source is one of a laser diode, a gas laser, and a solid state laser.

12. A method of reducing speckles in a projected image comprising:
    providing display light;
    phase-modulating the display light, wherein phase-modulating the display light includes positioning a reflective diffusing screen to receive the display light from a light source, wherein the reflective diffusing screen is coupled to an in-plane vibrator that includes at least one-comb drive actuator connected to move the reflective diffusing screen in-plane, the diffusing screen including a homogeneous micro-lens array;
    collimating the display light; and
    generating a projectable image with the display light using a display panel that receives the display light after the display light has been collimated and phase-modulated.

13. The method of claim 12, wherein providing display light includes combining a first light source, a second light source, and a third light source into the display light, wherein the first light source emits a first color light, the second light source emits a second color light, and the third light source emits a third color light.

14. The method of claim 12, further comprising:
    focusing the display light with a lens before phase-modulating the display light.

15. The method of claim 12, further comprising:
    directing the display light to the display panel with a polarizing beam splitter ("PBS"), wherein the display panel is a Liquid Crystal On Silicon ("LCOS") display.

* * * * *